C. W. Le Count.
Lathe Work-Holder.
N° 60,751.　　　Patented Jan. 1, 1867.
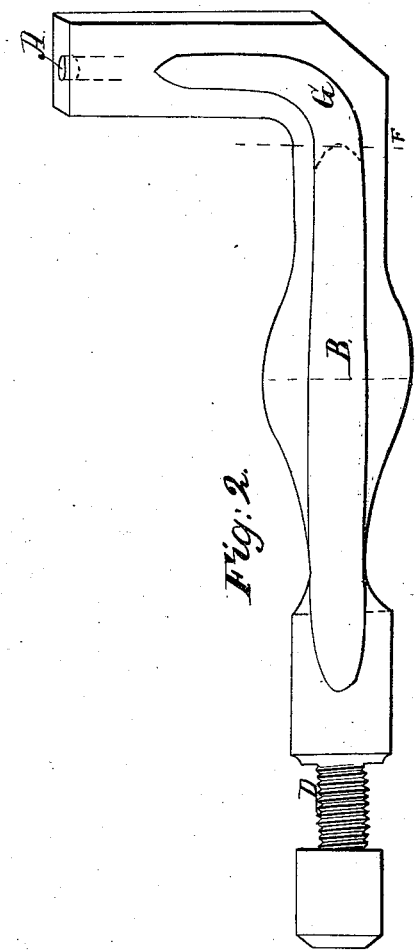
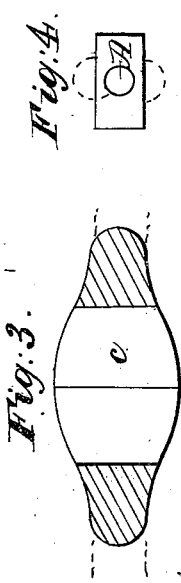
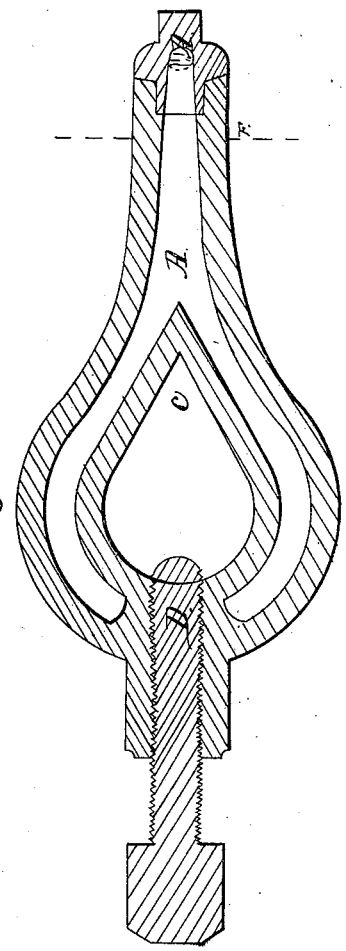
Witnesses:　　　　　　　　　Inventor:

United States Patent Office.

CHARLES W. LE COUNT, OF NORWALK, CONNECTICUT.

Letters Patent No. 60,751, dated January 1, 1867.

---

IMPROVED LATHE DOG.

---

The Schedule referred to in these Letters Patent and making part of the same.

---

TO ALL WHOM IT MAY CONCERN:

Be it known that I, CHARLES W. LE COUNT, of the town of Norwalk, county of Fairfield, and State of Connecticut, have invented a new and useful improvement in the mode of constructing Lathe Dogs or Carriers; and I do hereby declare that the following is a correct description thereof, reference being had to the accompanying drawing, and to the letters of reference marked thereon.

In the construction of lathe dogs and carriers it is essential to construct them as light as possible, compatible with the strength required to securely grip and rotate the work to be operated on; also to proportion and distribute the metal throughout its parts so that it may be balanced, or nearly so, on its centre of rotation when in use. To accomplish these desirable ends is the object of my invention; and it consists, first, in casting the body of the dog or carrier with a core throughout nearly its entire extent, whereby a stronger instrument is produced with less weight of metal; secondly, in disposing and proportioning the metal in the throat opposite the gripping screw and around the angle of the tail or carrying end in such manner as to insure the dog setting square upon the work, and at the same time to counterbalance the heavier end of the said dog and give proportionate strength to the parts subjected to the greatest strain, and thus produce a steadier rotation of the work and a more serviceable and consequently a cheaper instrument.

To enable others to make and use my invention, I will proceed to describe its construction and operation by referring to the drawings, in which—

Figure 1 represents a sectional face view of the common lathe dog embracing my improvements.

Figure 2, a side view of the same.

Figure 3, a transverse section on the line x x of fig. 1.

Figure 4, an end view of the tail of the dog.

The general formation of my dog resembles that of others heretofore used; that is to say, the eye c, through which the piece of metal to be turned is inserted, is made semicircular at one end and angular at the other, and through the centre of the semicircle is inserted a set-screw pointing towards the angular end, so that when a piece of round metal is inserted and the screw tightened on it, the metal is held between the screw and two sides of the angle, at about equal distances apart. A shank or tail extends from the angular end of the eye c a sufficient length, and is bent at right angles to the eye, forming an elbow, the arms of which will vary in length according to the size of the lathe with which it is to be used. The leverage upon this dog not being in a direct line, commonly causes it to bend or twist at the elbow, unless made very heavy, and in that case, when rotating at a rapid velocity, it not being perfectly balanced on its centre of rotation, causes the lathe to tremble so that perfectly true work cannot be produced. To remedy this evil I make my dog hollow by casting it with a core, A, commencing at or near the screw, D, and passing around both sides of the eye c, and through the tail to about mid-length of the outer arm; and as the tail portion is usually made of rectangular iron, I form a rib or swell, B G, on each side, over the part through which the core is inserted. This tubular form of construction makes a dog of much greater strength with less weight of metal, and prevents the tail from twisting. In the throat or angular portion of the eye c, I extend the metal laterally on each side, as shown in fig. 3, for two purposes: first, to give a better bearing for the metal to be turned in the eye of the dog, and insure setting at right angles to each other; and secondly, to increase the weight on that side of the centre of rotation opposite to the screw D, so as to counterbalance, or nearly so, the weight of said screw. This mode of construction, so far as the hollow portion of the invention is concerned, is equally applicable to the carrier on the mandrel of the lathe and the dog on the work to be operated on.

What I claim as new, and desire to secure by Letters Patent, is—

The hollow dog or carrier, constructed in the manner substantially as and for the purposes set forth.

C. W. LE COUNT.

Witnesses:
WM. VINE,
JOSEPH F. FOOTE.